United States Patent
McMahon et al.

(10) Patent No.: US 11,241,970 B2
(45) Date of Patent: Feb. 8, 2022

(54) METHOD AND APPARATUS FOR THE ALIGNMENT OF VEHICLES PRIOR TO WIRELESS CHARGING

(71) Applicant: Momentum Dynamics Corporation, Malvern, PA (US)

(72) Inventors: Francis J. McMahon, Malvern, PA (US); Andrew W. Daga, Malvern, PA (US); Edward J. Gander, Morton, PA (US)

(73) Assignee: Momentum Dynamics Corporation, Malvern, PA (US)

( * ) Notice: Subject to any disclaimer, the term of this patent is extended or adjusted under 35 U.S.C. 154(b) by 157 days.

(21) Appl. No.: 16/723,750

(22) Filed: Dec. 20, 2019

(65) Prior Publication Data

US 2020/0127506 A1 Apr. 23, 2020

Related U.S. Application Data

(63) Continuation-in-part of application No. 16/030,036, filed on Jul. 9, 2018, now Pat. No. 10,814,729, which
(Continued)

(51) Int. Cl.
*B60L 53/38* (2019.01)
*H02J 50/90* (2016.01)
(Continued)

(52) U.S. Cl.
CPC ............. *B60L 53/38* (2019.02); *B60L 53/126* (2019.02); *B60L 53/36* (2019.02); *H01Q 9/16* (2013.01);
(Continued)

(58) Field of Classification Search
CPC ........ B60L 53/38; B60L 53/36; B60L 53/126; H02J 50/90; H02J 50/12; H02J 50/80; H02J 7/02; H01Q 9/16; H01Q 9/42
(Continued)

(56) References Cited

U.S. PATENT DOCUMENTS

| 4,219,821 A | 8/1980 | Selim |
| 8,513,915 B2 | 8/2013 | Patel |

(Continued)

FOREIGN PATENT DOCUMENTS

| CN | 106981215 A | 7/2017 |
| WO | 2020013989 | 1/2020 |

OTHER PUBLICATIONS

"U.S. Appl. No. 16/030,036, Restriction Requirement dated Feb. 19, 2020", 8 pgs.
(Continued)

*Primary Examiner* — Richard Isla
*Assistant Examiner* — Manuel Hernandez
(74) *Attorney, Agent, or Firm* — Culhane Meadows, PLLC

(57) ABSTRACT

A vehicle alignment system is adapted to align a vehicle with a wireless power induction coil for wireless charging through use of magnetic resonant induction. The system includes a transmission line disposed in the parking slot so as to guide the vehicle to the wireless power induction coil for charging. The transmission line leaks a signal having an operating frequency that is detected to align the vehicle left-right in the parking slot when the vehicle is aligned for charging by the wireless power induction coil. At least two vehicle mounted antennas mounted on opposite sides of transmission line when the vehicle is aligned in the parking slot detect the operating frequency from the transmission line, and signal processing circuitry detects a relative signal phase between signals detected by the antennas that is representative of alignment of the vehicle with respect to the wireless power induction coil and the parking slot.

20 Claims, 13 Drawing Sheets

Related U.S. Application Data is a continuation of application No. 14/541,563, filed on Nov. 14, 2014, now Pat. No. 10,040,360.

(60) Provisional application No. 61/904,175, filed on Nov. 14, 2013.

(51) Int. Cl.
| | | |
|---|---|---|
| B60L 53/36 | (2019.01) | |
| H02J 50/12 | (2016.01) | |
| H01Q 9/16 | (2006.01) | |
| B60L 53/126 | (2019.01) | |
| H01Q 9/42 | (2006.01) | |
| H02J 50/80 | (2016.01) | |

(52) U.S. Cl.
CPC .............. *H01Q 9/42* (2013.01); *H02J 50/12* (2016.02); *H02J 50/90* (2016.02); *H02J 50/80* (2016.02)

(58) Field of Classification Search
USPC .................................. 320/108, 109; 307/104
See application file for complete search history.

(56) References Cited

U.S. PATENT DOCUMENTS

| | | | |
|---|---|---|---|
| 9,882,416 | B2 | 1/2018 | Amari |
| 10,040,360 | B1 | 8/2018 | Long et al. |
| 2006/0136109 | A1 | 6/2006 | Tanaka et al. |
| 2008/0265684 | A1 | 10/2008 | Farkas |
| 2010/0308767 | A1* | 12/2010 | Rofougaran ............ G01S 13/06 320/108 |
| 2011/0114401 | A1 | 5/2011 | Kanno |
| 2011/0309988 | A1* | 12/2011 | Parsche ............... E21B 43/2408 343/793 |
| 2012/0262002 | A1 | 10/2012 | Widmer et al. |
| 2013/0099962 | A1 | 4/2013 | Katz |
| 2013/0270921 | A1 | 10/2013 | Boys et al. |
| 2014/0125140 | A1 | 5/2014 | Widmer et al. |
| 2014/0183966 | A1 | 7/2014 | Suzuki et al. |
| 2014/0217966 | A1 | 8/2014 | Schneider et al. |
| 2015/0094887 | A1 | 4/2015 | Kawashima |
| 2015/0202970 | A1 | 7/2015 | Huang et al. |
| 2015/0236513 | A1 | 8/2015 | Covic et al. |
| 2015/0260835 | A1 | 9/2015 | Widmer et al. |
| 2016/0025821 | A1 | 1/2016 | Widmer et al. |
| 2016/0288657 | A1* | 10/2016 | Tokura .................... B60L 53/38 |
| 2016/0318413 | A1 | 11/2016 | Roehrl et al. |
| 2017/0111088 | A1 | 4/2017 | Seong et al. |
| 2017/0133889 | A1 | 5/2017 | Yeo et al. |
| 2017/0136880 | A1 | 5/2017 | Ricci |
| 2017/0274787 | A1 | 9/2017 | Salter et al. |
| 2017/0313202 | A1 | 11/2017 | Amari |
| 2018/0111492 | A1 | 4/2018 | Mccool et al. |
| 2018/0312071 | A1 | 11/2018 | Long et al. |
| 2019/0356178 | A1 | 11/2019 | Widmer et al. |
| 2020/0039371 | A1 | 2/2020 | Herzog et al. |
| 2020/0127506 | A1 | 4/2020 | McMahon et al. |

OTHER PUBLICATIONS

"U.S. Appl. No. 16/030,036, Response filed Feb. 21, 2020 to Restriction Requirement dated Feb. 19, 2020", 7 pgs.
"U.S. Appl. No. 16/030,036, Supplemental Amendment Filed Mar. 2, 2020 to Restriction Requirement dated Feb. 21, 2020", 7 pgs.
"U.S. Appl. No. 16/030,036, Non Final Office Action dated Mar. 27, 2020", 12 pgs.
"U.S. Appl. No. 16/030,036, Response filed Jun. 5, 2020 to Non Final Office Action dated Mar. 27, 2020", 9 pgs.
"U.S. Appl. No. 16/030,036, Notice of Allowance dated Jun. 24, 2020", 9 pgs.
International Application No. PCT/US2020/063573, International Search Report and Written Opinion of the International Searching Authority, dated Feb. 26, 2021, 35 pages.
Wrigley, "Folded and Loaded Antennas", rfcafe.com, Oct. 23, 2019, retrieved on [Jan. 30, 2021], Retrieved from the internet entire document.
"U.S. Appl. No. 14/541,563, Examiner Interview Summary dated Jan. 18, 2018", 2 pgs.
"U.S. Appl. No. 14/541,563, Final Office Action dated Nov. 2, 2017", 18 pgs.
"U.S. Appl. No. 14/541,563, Non Final Office Action dated Apr. 20, 2017", 30 pgs.
"U.S. Appl. No. 14/541,563, Non Final Office Action dated Aug. 8, 2016", 22 pgs.
"U.S. Appl. No. 14/541,563, Notice of Allowance dated Apr. 3, 2018".
"U.S. Appl. No. 14/541,563, Response filed Jan. 12, 2018 to Final Office Action dated Nov. 2, 2017", 11 pgs.
"U.S. Appl. No. 14/541,563, Response filed Jul. 20, 2017 to Non Final Office Action dated Apr. 20, 2017", 11 pgs.
"U.S. Appl. No. 14/541,563, Response filed Dec. 8, 2016 to Non Final Office Action dated Aug. 8, 2016", 10 pgs.
"International Application Serial No. PCT/US2019/039161, International Search Report dated Sep. 24, 2019", 2 pgs.
"International Application Serial No. PCT/US2019/039161, Written Opinion dated Sep. 24, 2019", 6 pgs.
European Application No. 19834203.2, Extended Search Report dated Jul. 29, 2021, 8 pages.

\* cited by examiner

METHOD AND APPARATUS FOR THE ALIGNMENT OF VEHICLES PRIOR TO WIRELESS CHARGING

CROSS-REFERENCE TO RELATED APPLICATIONS

This continuation-in-part application claims priority to U.S. patent application Ser. No. 16/030,036, filed Jul. 9, 2018, which, in turn, claims priority to U.S. patent application Ser. No. 14/541,563, filed Nov. 14, 2014, which, in turn, claims priority to U.S. Provisional Patent Application No. 61/904,175, filed Nov. 14, 2013, the disclosures of which are incorporated herein by reference in their entireties.

TECHNICAL FIELD

This patent application describes a vehicle alignment system as it pertains to wireless charging through use of magnetic resonant induction.

BACKGROUND

Resonant induction wireless charging makes use of an air core transformer consisting of two concentric coils displaced along a common coil axis. Transformer coupling coefficient and wireless power transfer efficiency is degraded if the primary and secondary coils are not axially aligned. For vehicle wireless charging this means some provision must be made so that the vehicle parking position is precise and repeatable in order to ensure coil axial alignment.

SUMMARY

Various details for the embodiments of the inventive subject matter are provided in the accompanying drawings and in the detailed description text below.

A vehicle alignment system aligns a vehicle with a wireless power induction coil for wireless charging through use of magnetic resonant induction. The system includes a transmission line leaking a signal having an operating frequency and that is disposed in a parking slot containing the wireless power induction coil. The transmission line guides the vehicle to the wireless power induction coil for charging. At least two vehicle mounted antennas mounted on respective sides of, and typically symmetrically with respect to, the transmission line when the vehicle is aligned in the parking slot detect the signal that leaks from the transmission line. Signal processing circuitry detects a relative signal phase between the signals received by the antennas on opposite sides of the transmission line. The relative phase differences between the detected signals from the antennas are representative of alignment of the vehicle left-right with respect to the transmission line.

In sample embodiments, a vehicle alignment system aligns a first wireless power induction coil of a vehicle with a second wireless power induction coil in a parking slot for wireless charging through use of magnetic resonant induction. The system includes a ground assembly disposed in the parking slot. The ground assembly may include a wireless charger comprising one or more wireless charging coils and magnetic inductive resonance communications transceivers and a beacon signal source that transmits a beacon signal. The system further includes a transmission line connected to the ground assembly and disposed in the parking slot so as to leak a signal having an operating frequency that is detected by the vehicle to guide the vehicle to the second wireless power induction coil for charging. In the sample embodiments, the transmission line comprises a continuous wireline monopole antenna disposed in a folded pattern relative to the ground assembly or a converging wireline dipole antenna having first and second sections that extend away from the ground assembly. In operation, the vehicle detects the signal having the operating frequency that leaks from the transmission line using at least two vehicle mounted antennas mounted on opposite sides of the transmission line when the vehicle is aligned in the parking slot and processes respective signals detected by the at least two vehicle mounted antennas to determine a relative signal phase between the respective signals that is representative of alignment of the vehicle left-right with respect to the transmission line. The transmission line may be disposed along a centerline of the parking slot or parallel to but offset from a center line of the parking slot. The transmission line also may be curved along a trajectory to guide the vehicle to the ground assembly in the parking slot. In sample embodiments, the operating frequency is 40.68 MHz or 13.56 MHz.

In further sample embodiments, a first end of the continuous wireline monopole antenna is connected to the ground assembly and offset on a first side of a centerline of the ground assembly. A second end of the continuous wireline monopole antenna is adjacent to the ground assembly on a second side of the centerline of the ground assembly. The continuous wireline monopole antenna also includes first and second sections that extend substantially in parallel on the first and second sides of the centerline of the ground assembly.

In other sample embodiments, the first and second sections of the converging wireline dipole antenna that extend away from the ground assembly are parallel to each other and offset on respective sides of a centerline of the ground assembly and first ends of the first and second sections are connected to the ground assembly.

In still other sample embodiments, a leaky transmission line is connected to the ground assembly and extends away from the ground assembly beyond an end of the transmission line that is remote from the ground assembly. In such embodiments, the beacon signal source of the ground assembly pulses a beacon signal on the leaky transmission line and provides a continuous beacon signal on the transmission line comprising the continuous wireline monopole antenna or the converging wireline dipole antenna.

In still further sample embodiments, a transmitter is provided at an end of the leaky transmission line that is remote from the ground assembly. The transmitter receives data from the ground assembly via the leaky transmission line and broadcasts at least a portion of the data received from the ground assembly. The data broadcast by the transmitter at the end of the leaky transmission line may include power levels offered by the ground assembly, power types (AC/DC) available at the ground assembly, connector types supported by the ground assembly, payment forms accepted by the ground assembly, whether a wireless charger of the ground assembly is in use, and/or time left in a charging session being performed by the ground assembly.

In accordance with other aspects, a method is provided for aligning a first wireless power induction coil of a vehicle with a second wireless power induction coil in a parking slot for wireless charging through use of magnetic resonant induction. The method includes a ground assembly disposed in the parking slot providing a beacon signal to a transmission line disposed in the parking slot so as to guide the vehicle to the second wireless power induction coil for charging; the transmission line leaking the beacon signal at an operating frequency, the transmission line comprising one of a continuous wireline monopole antenna disposed in a folded pattern relative to the ground assembly and a converging wireline dipole antenna having first and second sections that extend away from the ground assembly; aligning the vehicle left-right in the parking slot relative to the transmission line for charging by the second wireless power induction coil, the aligning comprising at least two vehicle mounted antennas mounted on opposite sides of the transmission line when the vehicle is aligned in the parking slot detecting the beacon signal at the operating frequency that leaks from the transmission line; and adjusting alignment of the vehicle relative to the second wireless power induction coil based on a relative signal phase between the respective signals that is representative of alignment of the vehicle left-right with respect to the transmission line.

In sample embodiments, the method further includes connecting a first end of the continuous wireline monopole antenna to the ground assembly and offsetting the first end on a first side of a centerline of the ground assembly, extending first and second sections of the continuous wireline monopole antenna substantially in parallel on the first side and on a second side of the centerline of the ground assembly, and placing a second end of the continuous wireline monopole antenna adjacent to the ground assembly on the second side of the centerline of the ground assembly.

In other sample embodiments, the method further includes placing the first and second sections converging wireline dipole antenna parallel to each other so as to be offset on respective sides of a centerline of the ground assembly and connecting first ends of the first and second sections to the ground assembly.

In still other sample embodiments, the method includes connecting a leaky transmission line to the ground assembly such that the leaky transmission line extends away from the ground assembly beyond an end of the transmission line that is remote from the ground assembly. In such embodiments, the ground assembly pulses a beacon signal on the leaky transmission line and provides a continuous beacon signal on the transmission line comprising the continuous wireline monopole antenna or the converging wireline dipole.

In yet other sample embodiments, the method includes providing a transmitter at an end of the leaky transmission line that is remote from the ground assembly, the transmitter receiving data from the ground assembly via the leaky transmission line, and the transmitter broadcasting at least a portion of the data received from the ground assembly. In sample embodiments, the transmitter broadcasts data including power levels offered by the ground assembly, power types (AC/DC) available at the ground assembly, connector types supported by the ground assembly, payment forms accepted by the ground assembly, whether a wireless charger of the ground assembly is in use, and/or time left in a charging session being performed by the ground assembly.

As discussed herein, the logic, commands, or instructions that implement aspects of the methods described herein may be provided in a computing system including a processor, a memory, and a wired communications subsystem. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter. Rather, it will be understood that the following section provides summarized examples of some of the embodiments described in the Detailed Description below.

BRIEF DESCRIPTION OF THE DRAWINGS

The foregoing and other beneficial features and advantages of the systems and methods described herein will become apparent from the following detailed description in connection with the attached figures, of which:

FIG. 8b shows a graphical representation of the signal error function of the folded wireline dipole antenna illustrated in FIG. 8a.

FIG. 9b shows a graphical representation of the signal error function of the converging wireline dipole antenna illustrated in FIG. 9a.

FIG. 10b shows a graphical representation of the signal error function of the vehicle alignment system illustrated in FIG. 10a.

DETAILED DESCRIPTION OF ILLUSTRATIVE EMBODIMENTS

The inventive systems and methods may be understood more readily by reference to the following detailed description taken in connection with the accompanying figures and examples, which form a part of this disclosure. It is to be understood that systems and methods are not limited to the specific products, methods, conditions or parameters described and/or shown herein, and that the terminology used herein is for the purpose of describing particular embodiments by way of example only and is not intended to be limiting. Similarly, any description as to a possible mechanism or mode of action or reason for improvement is meant to be illustrative only, and the systems and methods described herein are not to be constrained by the correctness or incorrectness of any such suggested mechanism or mode of action or reason for improvement. Throughout this text, it is recognized that the descriptions refer both to methods and software for implementing such methods.

A detailed description of illustrative embodiments will now be described with reference to FIGS. 1-10. Although this description provides a detailed example of possible implementations of the systems and methods described herein, it should be noted that these details are intended to be by way of example only and in no way delimit the scope of the claimed subject matter.

The functions described herein may be implemented, at least partially, in software in one or more embodiments. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Figure 1A:
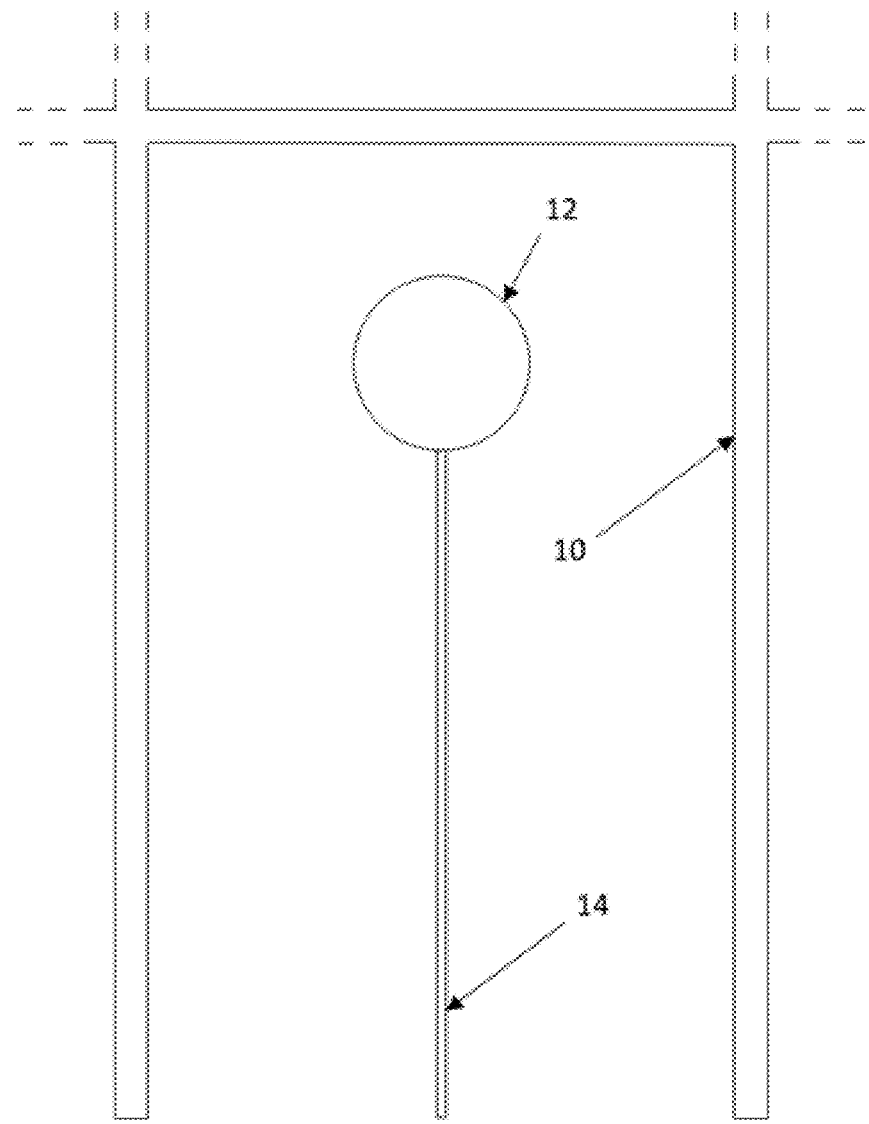
FIG. 1a shows a representation of a vehicle parking slot with an induction wireless power sending coil and an alignment system including a transmission line coincident with the parking slot center line.

FIG. 1a is a schematic representation of an automotive parking slot 10. The wireless power transfer primary coil 12 is shown near the head of the parking slot 10, although the wireless power transfer primary coil 12 could also be located at the foot of the parking slot 10 or elsewhere within the parking slot boundaries. No matter what the primary coil location, the vehicle must be parked within the indicated boundaries of the parking slot 10. A buried or surface mounted transmission line 14 extends along the parking slot centerline. This transmission line 14, connected to a low power continuous wave radio frequency source 20 (FIG. 2), creates a localized radio frequency field used by the vehicle mounted electronics to determine vehicle alignment within the perimeter of the parking slot 10. The transmission line 14 can vary in length and orientation from the short and straight embodiment shown in FIG. 1a or longer and curved as shown in FIGS. 1b and 1c.

Figure 1B:
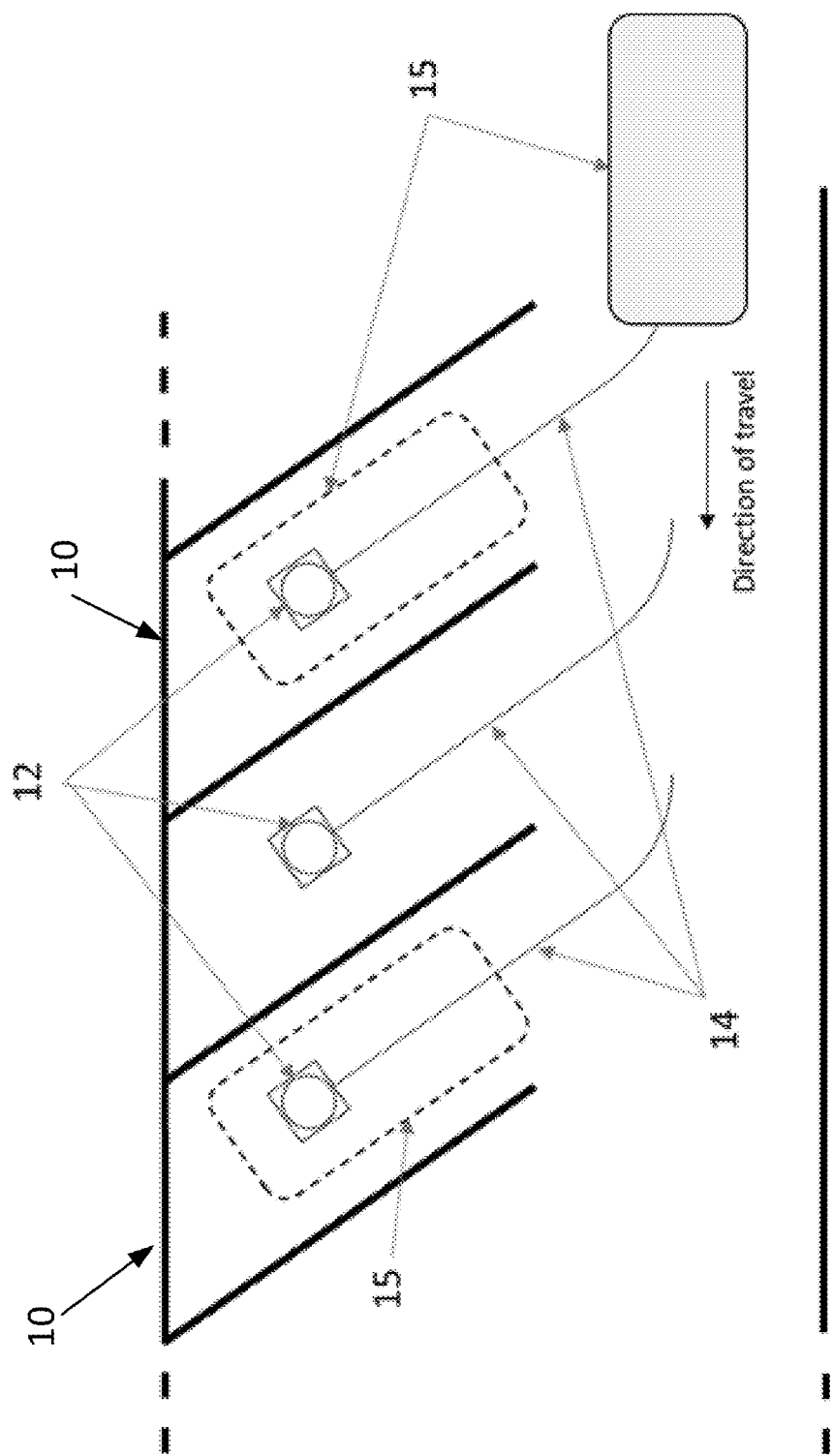
FIG. 1b shows a representation of a vehicle parking lot with angled parking slots, induction wireless power sending coils, and an alignment system that includes curved transmission lines that assist in guiding a vehicle to the proper location within the parking slot for charging.

FIG. 1b is a representation of a series of angled parking slots 10. The wireless power transfer primary coil 12 is shown in each of the angled parking slots 10 near the head-end. A buried or surface mount transmission line 14 runs within the parking slot along the centerline and extends out of the parking slot, curving into the lane of vehicle travel along a trajectory to guide the vehicle to the wireless power induction coil 12 in the parking slot 10. A vehicle 15 travels in a direction from right to left and receives the alignment signal from the transmission line and a low power continuous wave radio frequency source 20 (FIG. 2) for the appropriate slot where a charging primary coil 12 is available. The vehicle 15 uses the alignment signal from the transmission line 14 in conjunction with receive antennas on the vehicle 15 as described below with respect to FIG. 2.

Figure 1C:
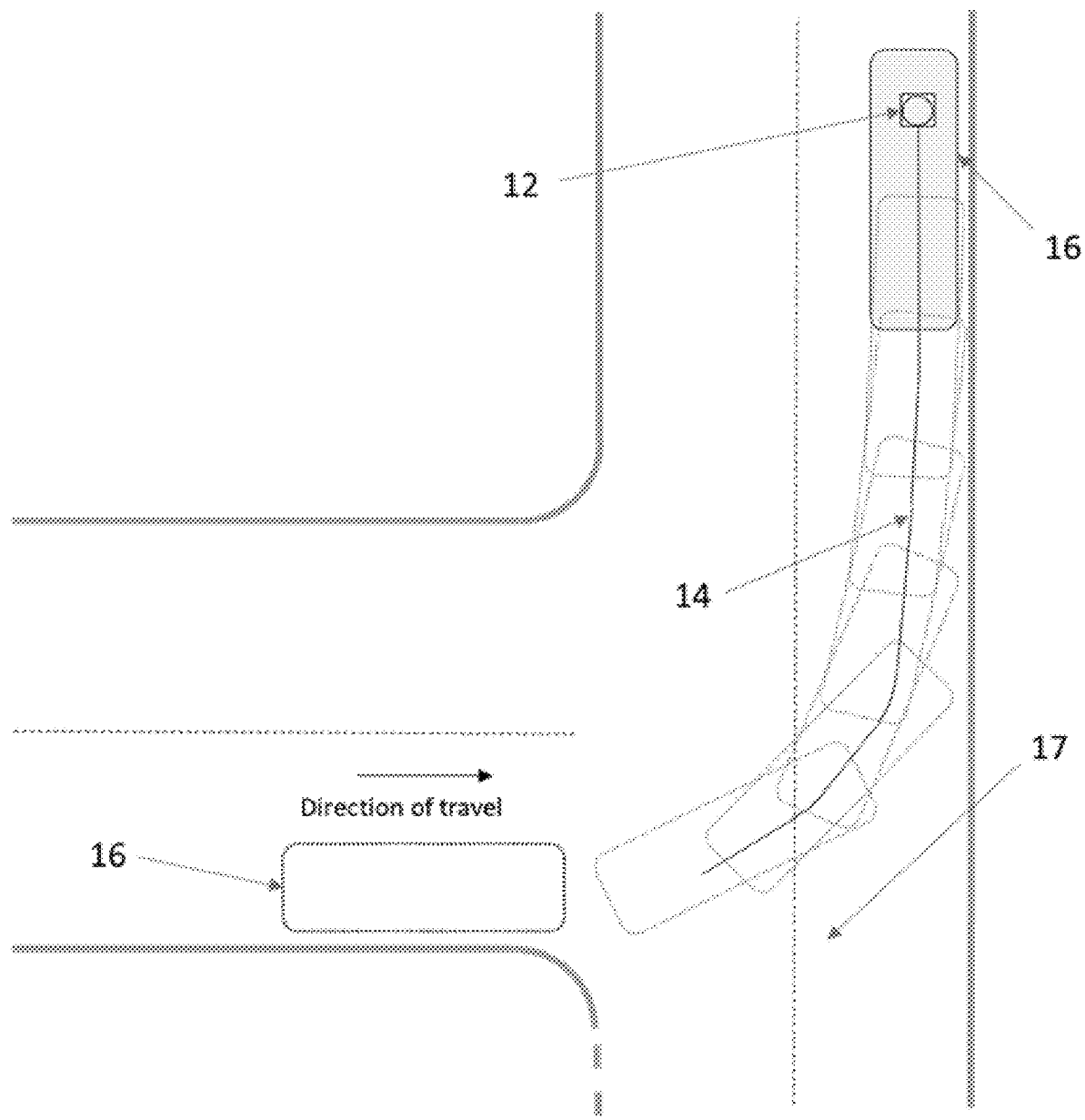
FIG. 1c shows a representation of a bus approaching an inductive charging location after a turn whereby a long curved transmission line of the alignment system ensures proper trajectory to get into alignment at the charging coil.

FIG. 1c is a representation of a bus 16 approaching a wireless inductive charging station including wireless power induction coil 12 after completing a turn. It is important that the bus 16 be properly aligned at the wireless power induction coil 12, and proper turning radius and location is critical in achieving the correct trajectory. In this example, transmission line 14 has a length many tens of feet long and embedded in the roadway 17 with the proper orientation to consistently guide the bus 16 along the correct path for proper alignment at the charging coil 12.

Figure 2A:
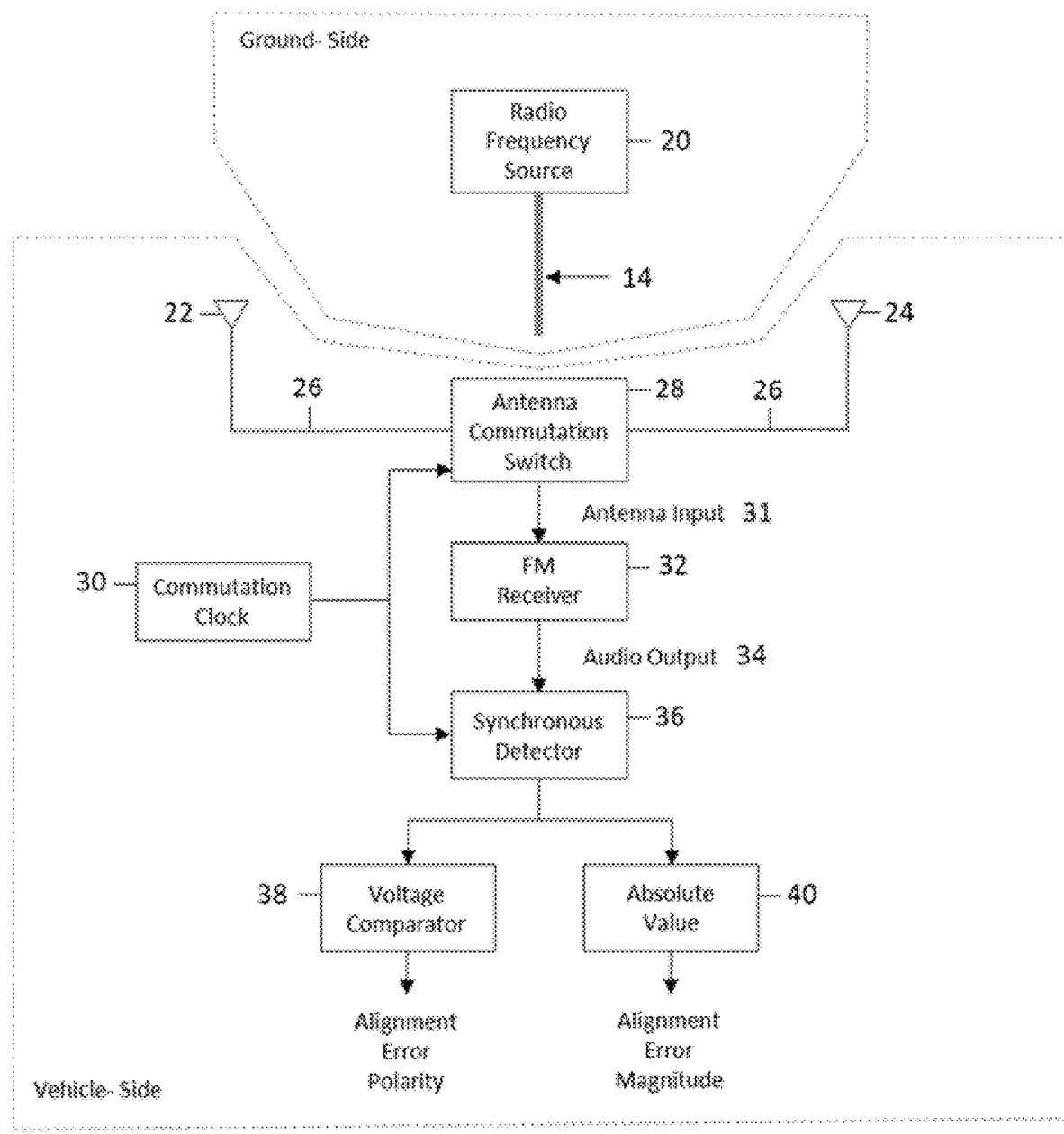
FIG. 2a shows a conceptual representation of the apparatus for vehicle parking alignment in accordance with a sample embodiment.

FIG. 2a is a block diagram representation of the alignment electronics. On the ground, there is a radio frequency source 20 and a length of transmission line 14. On the vehicle, there are two small antennas 22, 24 mounted equal distant to the left and the right of the vehicle centerline. Those skilled in the art will appreciate that the antenna 22, 24 could also be offset (not equidistant) provided the offset is accounted for in the detected phase offset. The antennas 22, 24 are connected by coaxial cable 26 to an antenna switch 28. The antenna switch 28 is controlled by the antenna commutation clock 30 to alternately connect one then the other antenna 22, 24 to a conventional frequency modulation radio receiver 32. In a sample embodiment, the commutation signal is a 50% duty cycle square wave.

When the two receiving antennas 22, 24 are placed equal distant from the transmission line 14 as is the case when the vehicle is symmetrically aligned within the parking slot 10 perimeter, the commutating action of the antenna switch 28 has no effect upon the receiver signal. The amplitude and the phase of the two antenna input signals 31 are identical and there is no response from the receiver 32. However, if the vehicle is mis-aligned within the parking slot 10, the vehicle antennas 22, 24 are no longer symmetrical with respect to the transmission line 14. The antenna switching action then introduces signal amplitude and phase perturbations at the commutation rate. The signal from the antenna closer to the transmission line 14 will have larger amplitude and leading phase with respect to the more distant antenna. The frequency modulation receiver 32 ignores the amplitude perturbations but detects the phase perturbations, frequency being the time rate of change of phase, thereby replicating the antenna switch commutation signal in the receiver audio output 34. The receiver audio commutation signal replica is altered by the limited receiver bandwidth. If the commutating signal frequency is above the receiver recovered audio pass band, there is no recovered commutation signal. If the commutating signal frequency is just above the lower receiver audio pass band frequency, the recovered commutation signal will approximate the original commutation square wave albeit low pass filtered by the receiver upper audio pass band limit. A commutation signal frequency in the upper half of the receiver audio pass band leads to a largely sinusoidal recovered audio signal.

As further illustrated in FIG. 2a, the audio output 34 is provided to synchronous detector 36 to detect the phase differences between the respective antenna signals, and output signals representative of any mis-alignments are provided to a voltage comparator 38 to determine alignment error polarity based on which signal has a leading phase or lagging phase and to an absolute value detector 40 that determines the alignment error magnitude. In sample embodiments, the alignment error polarity and alignment error magnitude signals are provided to a display device and other audiovisual means to provide feedback to the driver for adjusting the vehicle in the parking slot 10 with respect to the wireless power induction coil 12.

Figure 2B:
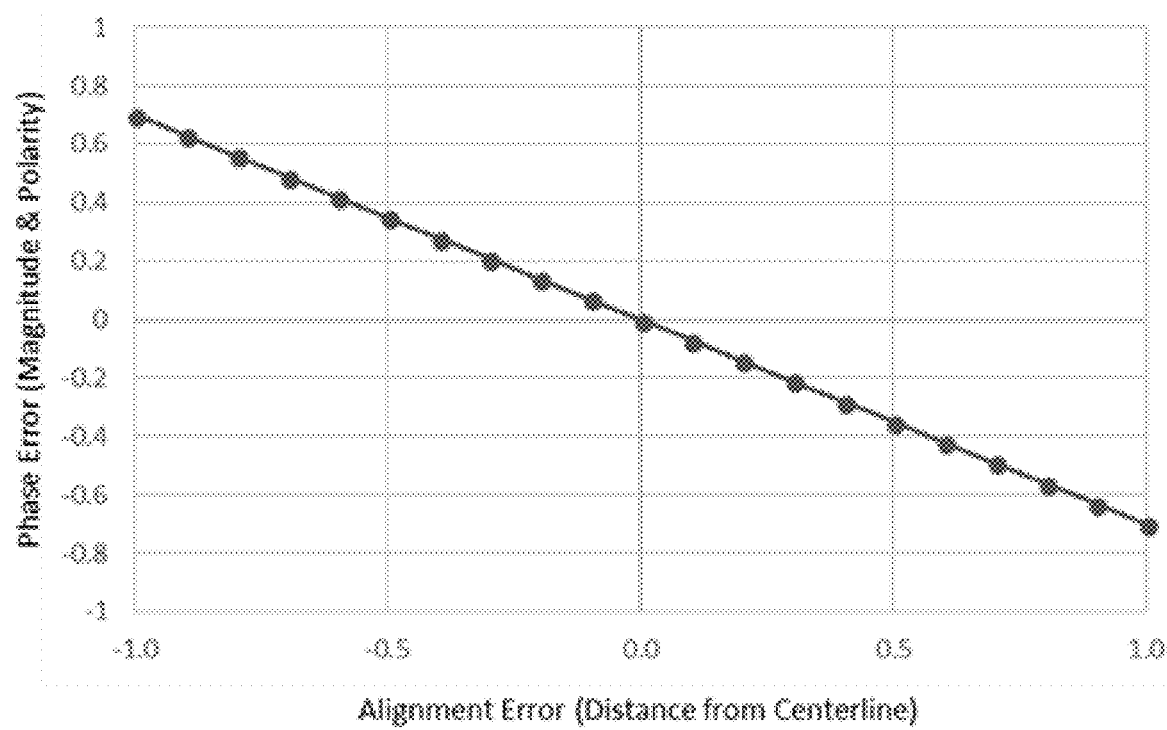
FIG. 2b shows a representative relationship between vehicle antenna phase difference and vehicle alignment.

FIG. 2b depicts an example representation of phase differences between the respective alignment antennas as a function of the alignment error or displacement from centerline.

The system maximum operating frequency provided by radio frequency source 20 is set by the separation between the two vehicle mounted antennas 22, 24 which must be less than the width of the vehicle. In the United States, the average parking slot width is about nine feet. Automobiles are typically no more than 8 feet wide. In order to avoid phase ambiguity, the two sensing antennas 22, 24 must be spaced no more than $\lambda/2$ apart at the operating frequency. For two sensing antennas separated by eight feet, the maximum system operating frequency is about 61.5 MHz. Higher frequencies and narrower antenna spacing is possible if the vehicle driver can be assumed to enter the parking slot with an initial alignment error less than $\frac{1}{2}$ of the parking slot width. Higher operating frequencies are also possible with the use of more than two vehicle mounted antennas with the additional antenna or antennas used to resolve phase ambiguity. Those skilled in the art will appreciate that there is no lower limit on the system operating frequency except the signal to noise ratio of alignment error becomes progressively worse as the operating frequency is lowered.

The apparatus described herein provides for vehicle alignment left-right with respect to the parking slot centerline. Vehicle left-right mis-alignment is indicated to the driver by visible, audible or tactile means. A visual indication may be an illuminated indicator, a graphical display or software generated graphical overlay imposed upon a video camera image. An audible indication may be a continuous or pulsating sound or a software generated speech synthesizer. Tactile indication may be provided by the vehicle steering wheel or steering mechanism, gear shift lever, the driver's seat or through the vehicle floor or through floor mounted vehicle control pedals. Driver visual cues or technical means described, for example, in U.S. Provisional Patent Application No. 61/862,572, filed Aug. 6, 2013, may be used to indicate and control where the aligned vehicle should stop for axial coil alignment in the front-back directions for assurance that the driver pulls far enough into the parking slot 10 to align the magnetic coils for charging.

Figure 3A:
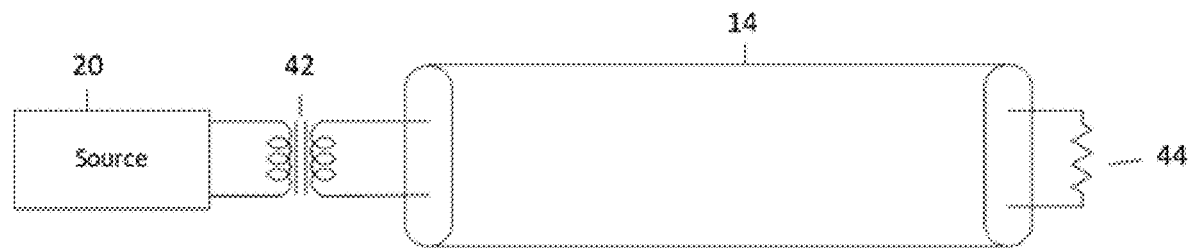
FIG. 3a shows an embodiment of the parking slot radio frequency source and transmission line implemented as a 300 Ohm balanced transmission line.
Figure 3B:
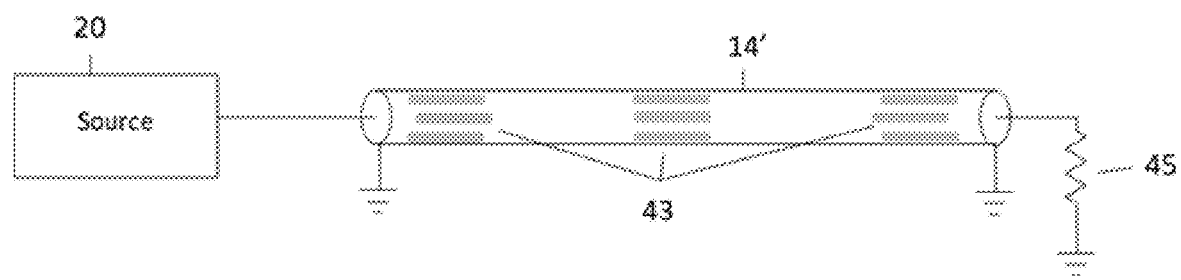
FIG. 3b shows an alternate embodiment of the parking slot radio frequency source and transmission line implemented as a terminated 50 or 75 Ohm coaxial cable with specially designed slots in the outer conductor or shield.

FIGS. 3a and 3b illustrate sample embodiments of the transmission line 14. In particular, FIG. 3a shows the radio frequency source 20 and a buried or surface mounted transmission line 14 that leaks a signal at the operating frequency. In this embodiment, a 40.68 MHz, fifty-ohm impedance continuous wave radio frequency source 20 provides radio frequency excitation. A power level of about 1 mW is used. A mini-circuits RF transformer 42, model number ADT 4-6T is used as an impedance matching balun. The transmission line 14 is implemented with a length of ordinary 300-ohm characteristic impedance balance transmission line. While this transmission line is not designed to be leaky, there is sufficient leakage to be picked up by antennas 22, 24 in sample embodiments. A 300-ohm resistor 44 terminates the end of the balance line in order to eliminate reflections and standing waves. The transmission line does not have to be balanced; a leaky un-balanced coaxial line would be equally suitable. Alternatively, other transmission line impedances such as 50 or 75-ohm coaxial cable with slots in the outer shielding could equally be used. FIG. 3b depicts an unbalanced 50 or 75 Ohm coaxial cable transmission line 14' with specially designed slots 43 and termination resistor 45 that is matched to the coaxial cable's characteristic impedance.

Figure 4:
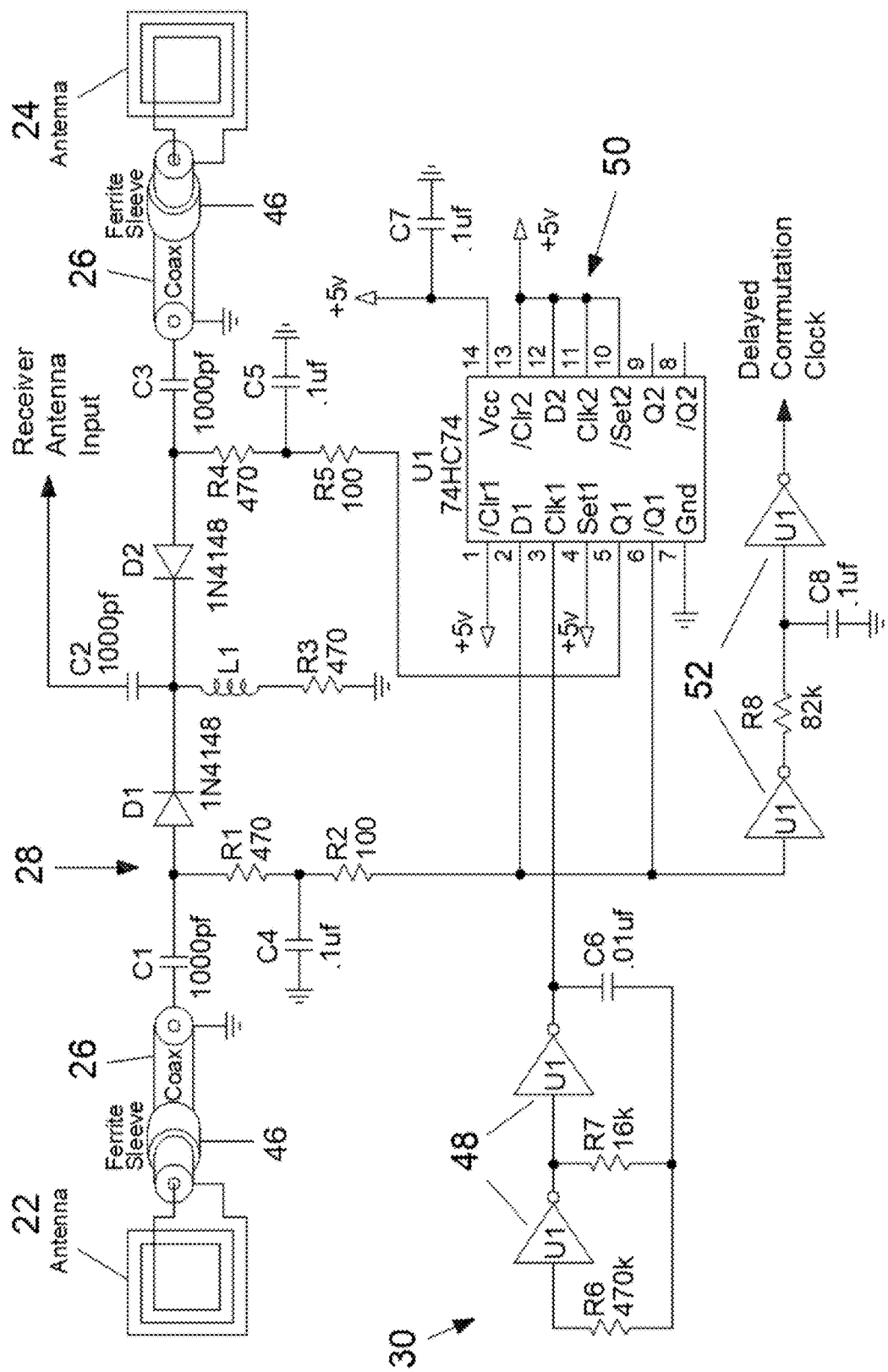
FIG. 4 shows an embodiment of the antenna commutation switch and associated circuitry.

FIG. 4 shows the circuitry associated with the antennas 22, 24, antenna commutating switch 28, and commutation clock 30 of FIG. 2. In sample embodiments, the antennas 22, 24 include rectangular spirals fabricated on a printed circuit board to ensure antenna-to-antenna consistency. The number of turns for the rectangular spirals depends on the desired value of inductance for the antenna that will be resonated with capacitance to achieve the desired response at the operating frequency. In a sample configuration, ten turn rectangular spirals were used for antennas 22, 24. The antennas 22, 24 are electrically small and are not resonant at the operating frequency without the employment of an additional capacitance. Each antenna 22, 24 is connected to a length of ordinary 50-ohm characteristic impedance coaxial cable 26. The two cables 26 are equal in length when the antennas are symmetrically spaced with respect to the centerline of the vehicle and each has a ferrite sleeve 46 including several ferrite beads slipped over the cable 26 at the ends connected to the antennas 22, 24 to serve as baluns and to suppress RF currents that would otherwise be induced on the cable outer conductors. Induced RF currents introduce significant system errors and must be suppressed. An operation frequency of 40.68 MHz is used in a sample embodiment. This frequency is near optimum for this application and is allocated nationally and internationally for ISM (Industrial, Scientific and Medical) uses which include RF heating, Doppler based frequency or phase sensitive motion and intrusion alarms, diathermy, cauterization and other non-communications uses. ISM frequencies are set aside for non-communications uses, but they can also be used for communications if the users are willing to accept the possibility of radio interference from the primary ISM applications. The advantage for doing so is significantly reduced equipment certification and spectrum allocation regulatory burdens. As the maximum range of the vehicle alignment system described herein is a few feet at most, the probability of radio interference from other 40.68 MHz ISM frequency users is quite remote.

An RC oscillator 30 comprised of two logic inverters 48, resistors R6 and R7 along with capacitor C6 generates a rectangular wave signal at twice the desired antenna commutation frequency which is then divided by 2 by a D flip-flop 50, thereby generating a commutation clock at the desired frequency with 50-50 duty cycle. Components R1, R3, R4, D1, D2, and L1 comprise a diode RF switch 28 controlled by the Q and not Q flip-flop outputs. R2, R5, C4, and C5 slow the leading and trailing edges of the switch control waveform thereby limiting switching transients. R8, C8 and associated logic inverters 52 delay the antenna commutation clock control signal to compensate for the receiver delay. C1, C2, and C3 are AC (Alternating Current) coupling capacitors that block DC (Direct Current) signals but pass the RF (Radio Frequency) signal. C7 is a bypass capacitor that filters RF noise from the voltage source of D flip-flop 50.

Figure 5:
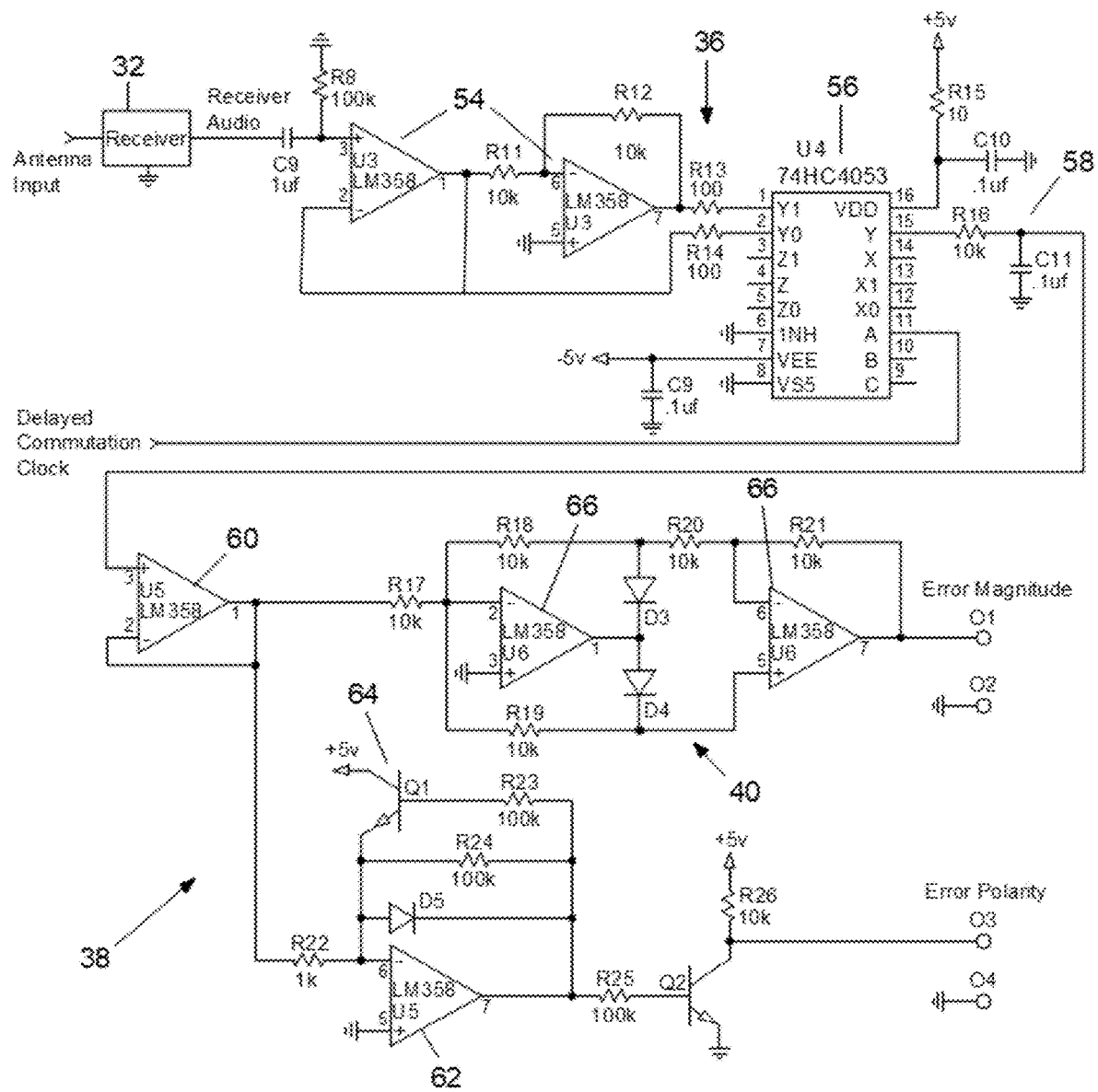
FIG. 5 shows an embodiment of the post FM receiver signal processing circuitry.

FIG. 5 shows the post receiver signal processing circuitry. The output of the antenna commutation switch 28 goes to the antenna input of a conventional narrowband FM receiver 32. The circuit includes a consumer grade pocket sized scanning receiver, a Uniden BC72XLY compact scanner, but any narrowband VHF FM receiver implementation, analog or digital, hardware or software is acceptable. Vehicle alignment error appears in the receiver audio output as a bandwidth limited square wave at the antenna commutation clock frequency. Square wave magnitude indicates alignment error magnitude; square wave polarity indicates alignment error direction, left or right. Synchronous detection then produces a DC voltage with amplitude proportional to alignment error and with polarity indicating alignment error direction.

The two op-amps 54 amplify the audio signal from the FM receiver by gains of one and minus one. Integrated circuit 56 contains three single-pole double throw (SPDT) CMOS FET switches one of which is used as a synchronous rectifier driven by the delayed antenna commutation switch control signal. A low pass filter 58 comprised of resistor R16 and capacitor C11 follows the SPDT switch 56 and removes all commutation frequency ripples leaving a direct current signal with amplitude proportional to vehicle misalignment and polarity determined by the direction of the vehicle alignment error, left or right of the parking slot centerline. An absolute magnitude circuit 40 recovers the magnitude of the vehicle displacement error while a voltage comparator 38 determines the error polarity.

The two op-amps 60, 62 are used as a post RC low pass filter buffer amplifier and as a zero-reference voltage comparator, respectively. The components associated with transistor 64 keep the op-amp section out of voltage saturation thereby avoiding the subtle problems sometimes experienced when using op-amps in an open-loop connection as voltage comparators. The voltage comparator 38, implemented by op-amp 62, provides a logic level signal that indicates the polarity of the alignment error, left or right. Op-amps 66 and associated components comprise an absolute value detector 40 providing a unipolar representation of the alignment error magnitude independent of the polarity of the post synchronous detector signal.

In the implementation described above, the vehicle dual sense antennas 22, 24 and the transmission line 14 are mounted along the vehicle centerline and parking slot center line, respectively. Offset locations as might be required to avoid vehicle underbody and parking slot obstacles can be accommodated by including the appropriate offset correction in the post synchronous detector hardware or software. In the latter situation, the required offset correction is provided by the ground to vehicle communications link.

Alternative Embodiments

As alternative embodiments, more complex antenna shapes and additional antennas embedded in the pavement or affixed to the pavement surface may be implemented to add functionality to the vehicle alignment system. This added functionality includes the ability to determine an approximate distance, speed, and rate of deceleration to the Ground Assembly (GA) charging pad as the vehicle approaches using the same vehicle mounted receiver and antenna. The distance, speed, and rate of deceleration may be provided to a vehicle controller or the vehicle controller may calculate these values from provided measurements. In such embodiments, the radio frequency source (co-located or incorporated within the GA) may produce a continuous wave beacon signal or a pulsed or otherwise modulated output on the antennas. The error function, using both received signal strength and received phase, as previously described, may be used for alignment when a leaky line is implemented.

Figure 6:
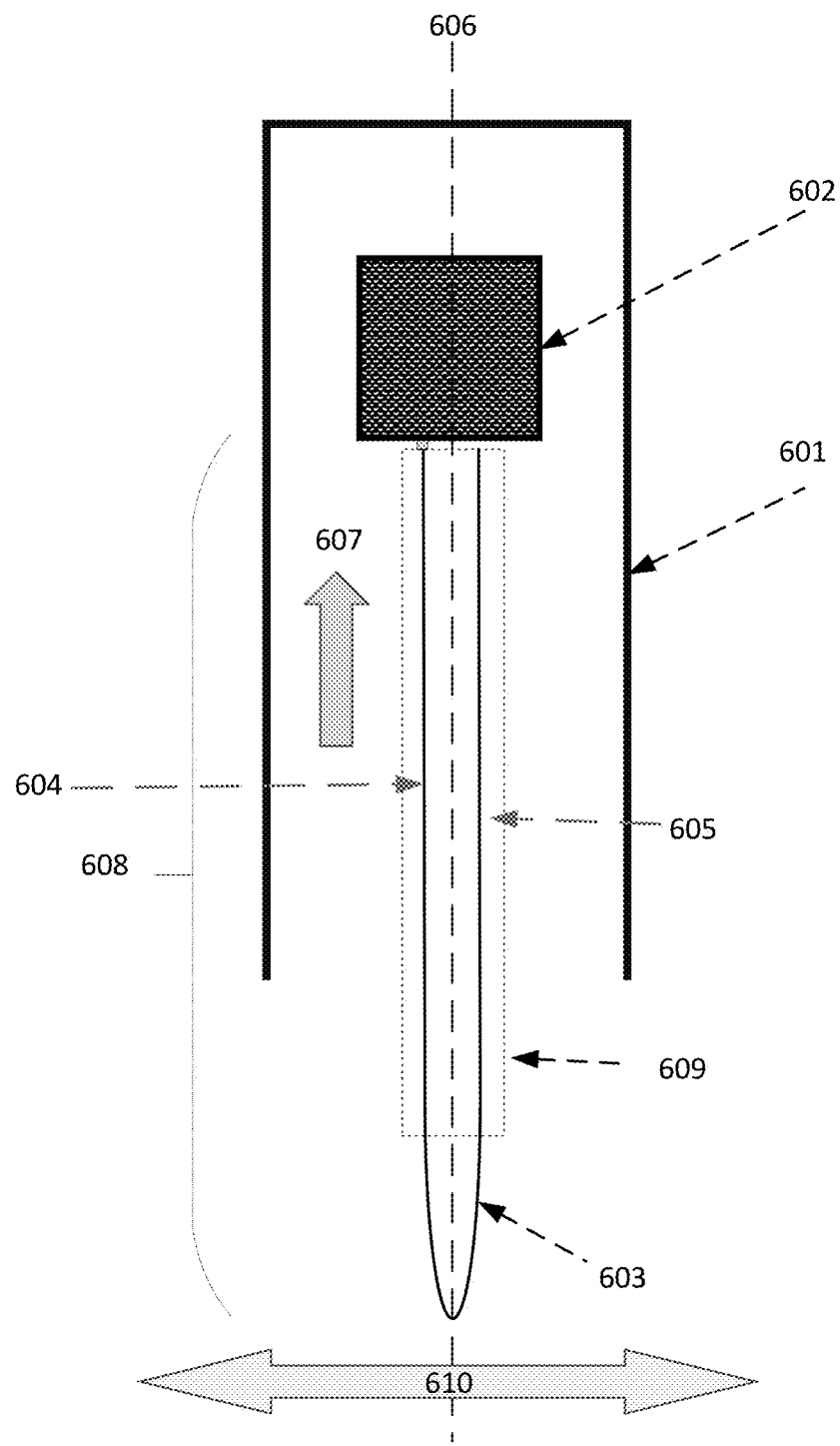
FIG. 6 shows an alternative embodiment of an alignment system for the approach to a magnetic induction resonant wireless charger in a typical pull-in parking stall.

It is noted that in the following figures the right and left designations are from the viewpoint of the approaching vehicle and are for purposes of illustration only and may be reversed in application. For instance, left and right are reversed when a vehicle is backing into a parking stall. The X and Y axes are as defined as in ISO 4130. All examples use the 'pull-in' or 'pull-forward' perspective for consistency. When using a 'reverse-in' parking method (where the vehicle backs into the parking stall), the left-and-right directions will be reversed. [0057] FIG. 6 shows an embodiment of one such improved alignment mechanism for the approach to a magnetic induction resonant wireless charger in a typical (e.g., 90°) pull-in parking stall. The same mechanism may be deployed in other parking arrangements such as 45°) parking stalls or a pull-up (parallel parking) curbside spot(s). A "folded" or "semi-elliptical antenna" provides alignment service to vehicles entering the parking spot from all directions (straight-on, from the right, or from the left).

The parking stall 601 is an area defined by pavement striping, poles, curbs or other indicia. The Ground Assembly (GA) 602 (a wireless charger including one or more wireless charging coils and ancillary magnetic inductive resonance communications transceiver(s)) is placed to be accessible to the incoming vehicle (note that in various countries, the placement of the GA within the parking stall may be affected by local regulation, types of vehicle(s) to be served, and local parking customs). The folded, continuous wireline monopole transmission antenna 603 is comprised of a left section 604 and a right section 605. The transmission antenna 603 is laid (either affixed to the surface or embedded in the pavement) to form a folded or semi-elliptical pattern, the signal and antenna originating at a position near the centerline 606 of the GA 602 facing the incoming direction 607 and ending adjacent to the GA 602 on the opposite side of the centerline 606. Depending on the length of the parking stall 601 and the frequency used, the monopole antenna 603 may extend a full or fractional wavelength. For instance, using the ISM frequency of 13.56 MHz, a full-wave antenna of 22.11 meters would allow a folded deployment of under 11 meters in overall length 608. The spacing of the parallel sections of the transmission antenna 609 is such that the vehicle-mounted receiver antennas 22, 24 are inside the transmission antenna sections 609 after a vehicle has turned into the parking stall 601 from a direction of travel 610.

Figure 7:
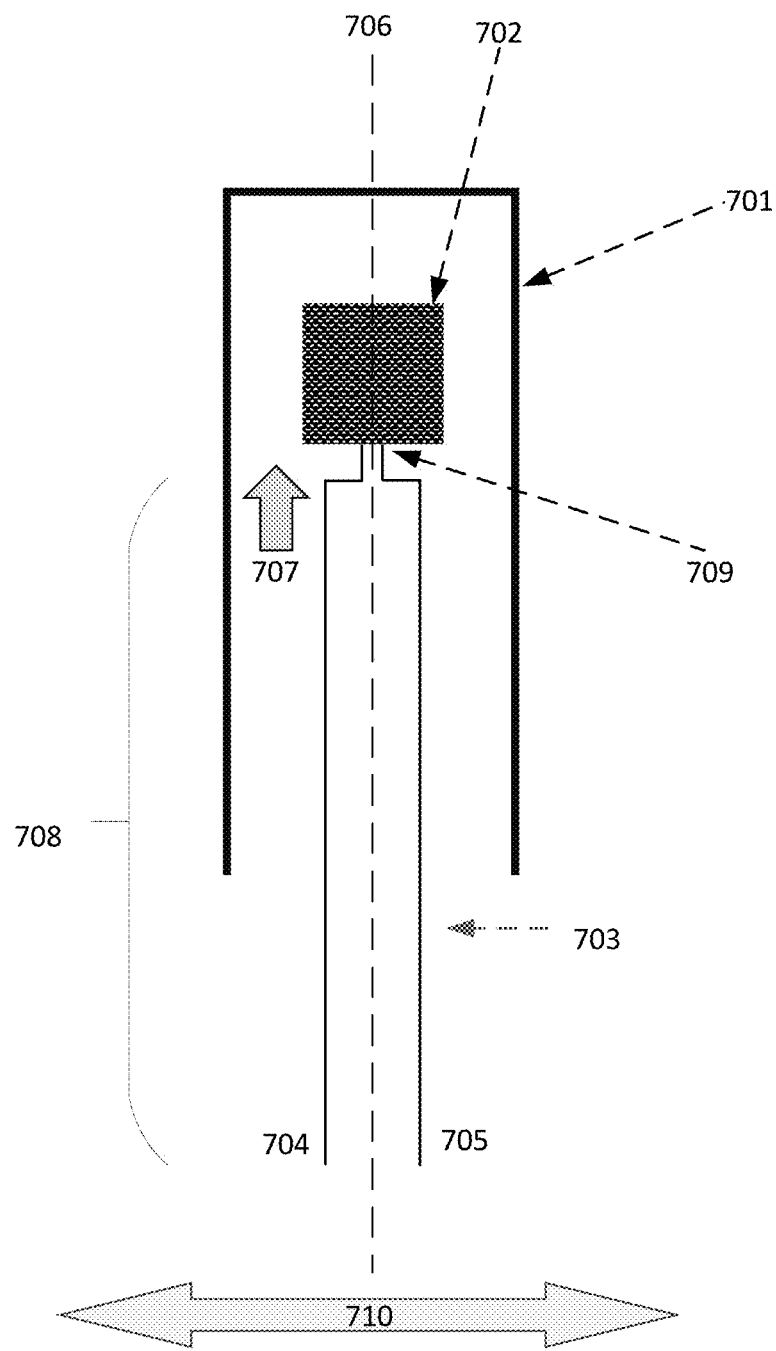
FIG. 7 shows another alternative embodiment of an alignment system for the approach to a magnetic induction resonant wireless charger in a typical pull-in parking stall.

FIG. 7 shows another embodiment of an improved alignment mechanism for the approach to a magnetic induction resonant wireless charger in a typical (e.g. 90°) pull-in parking stall. The same mechanism can be deployed in other parking arrangements such as 45°) parking stalls or a pull-up (parallel parking) curbside spot(s). The "converging antenna" design shown in FIG. 7 provides alignment service to vehicles entering the parking spot from any of the right, left or straight on directions.

The parking stall 701 is an area defined by pavement striping, poles, curbs or other indicia. The Ground Assembly (GA) 702 (a wireless charger including one or more wireless charging coils and ancillary magnetic inductive resonance communications transceiver(s)) is placed to be accessible to the incoming vehicle (in various countries, the placement of the GA may be affected by local regulation, types of vehicle(s) to be served, and local parking customs) for pull-in, back-in, or parking stall type (45°, 90°), parallel or curbside) parking. The converging leaky line transmission antenna vehicle alignment system of FIG. 7 allows for approach from either direction of travel 710 or straight in 707. Not shown but supported is use of the converging leaky line transmission antenna vehicle alignment system for parallel or curbside usage.

The converging wireline dipole antenna 703 includes a left section 704 and a right section 705. The leaky line-based transmission antenna 703 is laid (either affixed to the surface or embedded in the pavement) to form a parallel pattern, where the signal and antenna both originate from a transmitter either co-located or incorporated into the GA 702 located at the centerline 706 of the GA 702. Depending on the length of the parking stall 701 and the frequency used, the monopole antenna 703 may extend a full or fractional wavelength. For instance, using the ISM frequency of 13.56 MHz, a full-wave antenna 703 of 22.11 meters would allow a deployment of just over 11 meters, resulting in an overall length 708 of 5.5 meters. The physical antenna split 709 occurs next to the GA 702 and the apparent distance in FIG. 7 is exaggerated for purposes of illustration.

Non-symmetric (around the centerline 706) placement of the transmission antenna 703 is also contemplated if the offset(s) is known for compensation of received signal characteristics (e.g. received signal strength and signal phase).

Figure 8A:
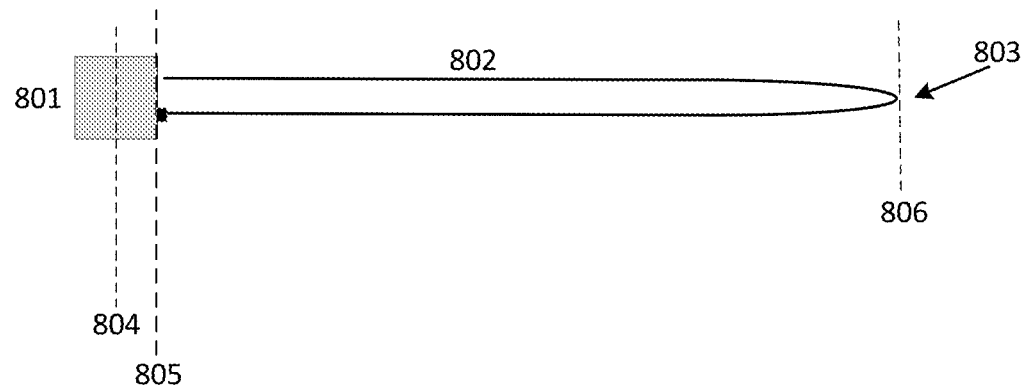
FIG. 8a shows a folded wireline dipole antenna having at one end thereof a ground assembly hosting a beacon signal source.

FIG. 8a shows a folded wireline dipole antenna 802. At one end of the folded dipole antenna 802 is the GA 801, which hosts a beacon signal source. The centerline 804 of the GA 801 shows the y-axis point where the vehicle's VA (vehicle assembly) resonant inductive coil center should be positioned for maximum wireless power transfer efficiency. The antenna 802 extends in a direction opposite the direction of approach to the limit of ½ the wavelength (or ¼$^{th}$ the wavelength if implemented as a half-wave antenna). The curved end 803 of the folded antenna 802 serves as the signal acquisition threshold 806 where both receiver antennas 22, 24 can reliably detect the beacon signal regardless of the vehicle angle of approach indicating the beginning of the antenna 802. The GA-to-Antenna threshold 805 is the point where the signal transmitted by the wireline dipole antenna 802 indicates the end of the antenna 802.

Figure 8B:
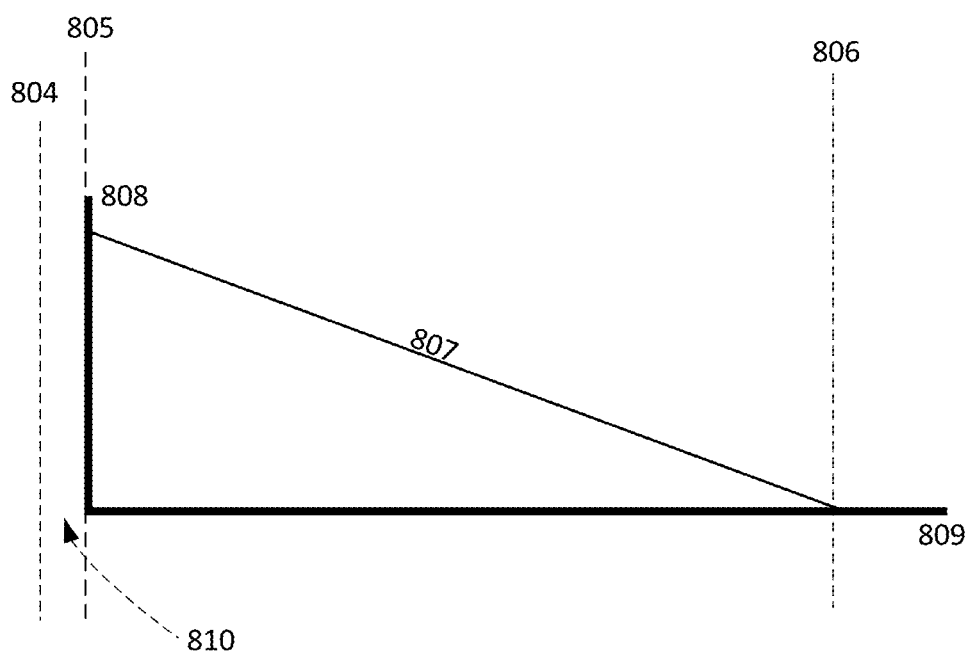

FIG. 8b shows a graphical representation of the signal error function of the folded wireline dipole antenna illustrated in FIG. 8a. The X-axis 809 shows the range while the Y-Axis 808 shows the relative beacon signal phase difference 807 between the receiver antennas 22, 24. As the vehicle moves over the end 803 of the folded wireline antenna 802, both receiver antennas 22, 24 begin to receive the beacon signal. At this first signal acquisition detection threshold 806, the received beacon amplitude and phase are nearly identical, minimizing the error function. After the right 24 and left 22 antennas pass the initial ambiguous region around the end 803 of the antenna 802 (moving toward the GA 801), the phase of the signal received by the right 24 and left 22 VA receiver antennas begin to diverge.

As the vehicle continues to proceed toward the GA 801, the system uses the signal strength at the right 24 and left 22 receiver antennas to provide a vehicle Y-axis alignment indication while the divergence in the signal phase at the right 24 and left 22 receiver antennas is used to provide a vehicle X-axis indication. The vehicle X and Y axis indications (and potentially the computed speed and deceleration) are passed periodically to the driver, driver-assist, or fully automated driving system to be used to control steering and braking.

As the vehicle continues to proceed toward the GA 801, the vehicle alignment system continues to use the received signal strength at the right 24 and left 22 receiver antennas to provide a Y axis alignment indication while the divergence in the received signal phase at the right 24 and left 22 receiver antennas approaches 180° at the antenna origin 805. At the antenna threshold position 805, where phase equals 180°, the relative signal strength is expected to be reduced to zero between both receiver antennas 22, 24 giving a secondary indication of the antenna threshold 805 having been reached, thus providing a clear indication that the edge of the GA 801 has been reached and that a final precise positioning system may be activated to cover the distance from 805 to 804 or the vehicle velocity at the antenna threshold 805 may be used in estimating when the vehicle must be at zero velocity to be positioned over the GA centerline 804. Final positioning in the distance 810 from the GA edge 805 to the GA centerline 804 may be a coil alignment method (e.g. as described in "METHOD OF AND APPARATUS FOR DETECTING COIL ALIGNMENT ERROR IN WIRELESS INDUCTIVE POWER TRANSMISSION", Ser. No. 14/910,071, Filed Feb. 4, 2016) or using a predictive model based on velocity, deceleration, and vehicle stopping characteristics (e.g. braking rate, vehicle weight).

Figure 9A:
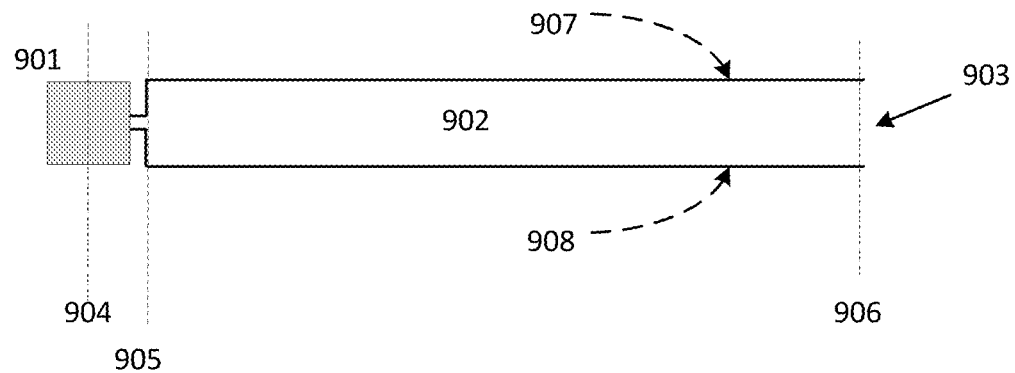
FIG. 9a shows a converging wireline dipole antenna having at one end thereof a ground assembly hosting a beacon signal source.

FIG. 9a shows a converging wireline dipole antenna 902 having at one end thereof a GA 901 that hosts a beacon signal source. The centerline 904 of the GA 901 shows the y-axis point where the vehicle's VA (vehicle assembly) resonant inductive coil center should be positioned for maximum wireless power transfer efficiency. The antenna 902 extends opposite the direction of approach to the limit of ½ the wavelength (or ¼th the wavelength if implemented as a half-wave antenna). The separated end 903 of the parallel right antenna element 907 and left antenna element 908 serves as the signal acquisition threshold 906 where both vehicle-based receiver antennas 22, 24 can reliably detect the transmitted beacon signal regardless of the vehicle angle of approach. The GA-to-Antenna threshold 905 is the point where the signal transmitted by the wireline dipole antenna 902 indicates the end of the antenna 902.

When using the converging wireline dipole antenna 902 for vehicle alignment, the vehicle, whether human-driven or automated, enters the charger-equipped parking stall, moving toward the GA 901. The vehicle-mounted receiver antennas 22, 24 will detect the transmitted signal from the converging wireline dipole antenna 902 at the signal acquisition threshold 906. The transmitted signal will be received at the right 24 and left 22 receiver antennas.

Figure 9B:
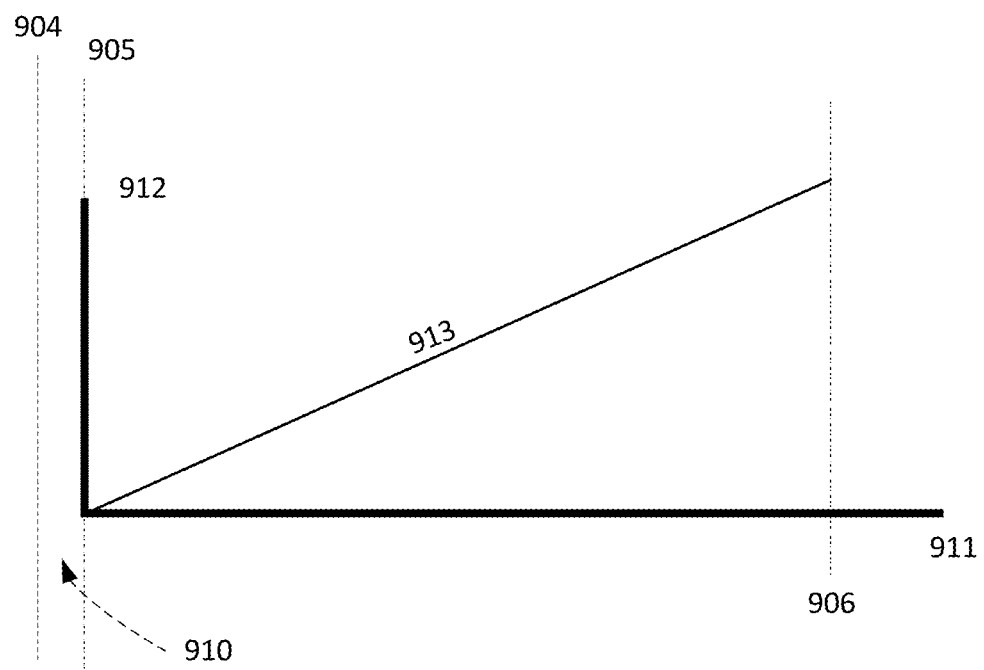

FIG. 9b shows a graphical representation of the signal error function of the converging wireline dipole antenna 902 illustrated in FIG. 9a. The X-axis 911 shows the range while the Y-Axis 912 shows the relative beacon signal phase difference 913 between the receiver antennas 22, 24. As the vehicle moves over the end 903 of the wireline antenna 902, both receiver antennas 22, 24 begin to receive the beacon signal. At first, signal acquisition, detection, amplitude relative amplitude will indicate error in Y positioning (a zero in relative signal strength indicates correct Y positioning) while the received phase will be 180° out-of-phase at initial signal acquisition at the right 24 and left 22 receiver antennas (note that if a ¼ wave antenna is used, the phase difference will be 90°). As the vehicle moves forward, after the right 24 and left 22 antennas pass the end 903 of the antenna 902 (moving toward the GA 901), the phase difference 913 of the signal received by the right 24 and left 22 receiver antennas begin to diminish as the vehicle approaches the GA 901. The amplitude relative value of the signal received at the right 24 and left 22 receiver antennas is used to determine Y-axis (side-to-side) axis tracking. The X and Y axis indications are passed periodically to the driver, driver-assist, or fully automated driving system to be used to control steering and braking.

As the vehicle continues to proceed toward the GA 901, the system uses the signal strength at the right 24 and left 22 receiver antennas to continue to produce a Y axis alignment indication while the dwindling difference in the signal phase as received at the right 24 and left 22 receiver provides the X-axis range-to-GA indication. At the position where phase difference equals 0°, the right-to-left difference signal strength is expected to be reduced to zero. This event gives a clear indication that the edge of the GA 901 has been reached and that final coil positioning (e.g. as described in "METHOD OF AND APPARATUS FOR DETECTING COIL ALIGNMENT ERROR IN WIRELESS INDUCTIVE POWER TRANSMISSION", Ser. No. 14/910,071, Filed Feb. 4, 2016). can be activated to cover the distance 910 from the GA edge 905 to the GA centerline 904 or the vehicle velocity and deceleration rate at the antenna threshold 905 may be used in estimating when the vehicle must be at zero velocity to be positioned over the GA centerline 904 taking into account vehicle characteristics such as braking rate and vehicle weight.

Figure 10A:
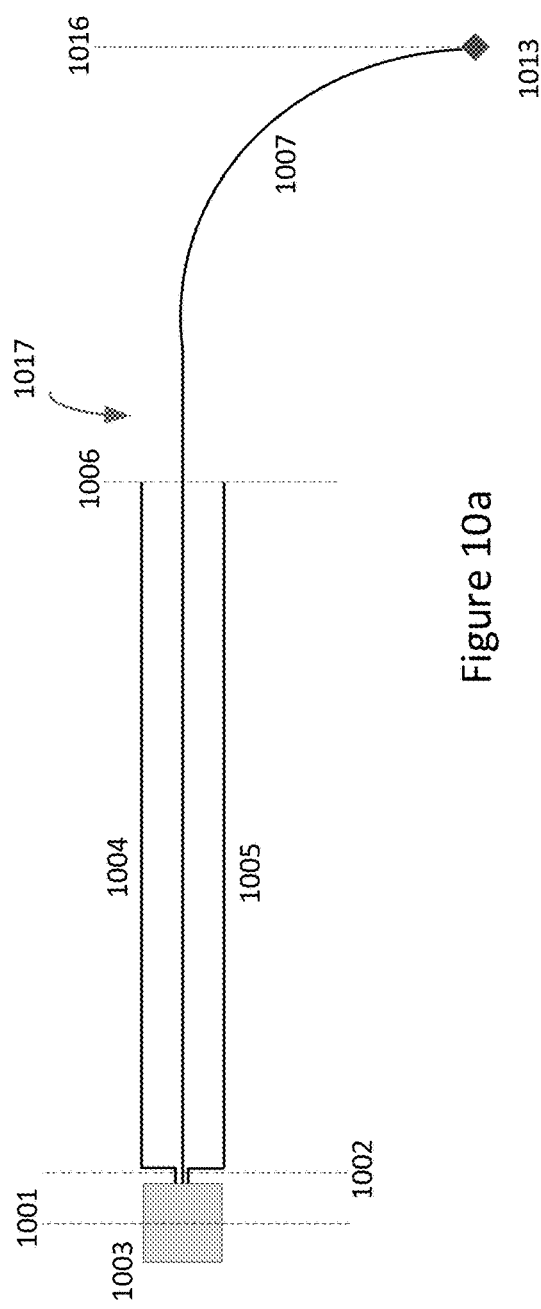
FIG. 10a shows a vehicle alignment system for wireless power transfer positioning using both a leaky transmission line to provide initial guidance and a ½ wave 'converging antenna' for alignment and ranging from the antenna end to a wireless charging pad of a ground assembly.

FIG. 10*a* shows a vehicle alignment system for wireless power transfer positioning using both a long (the long antenna may be shorter or longer than a full wavelength dependent on the deployment) leaky transmission line 1007 to provide initial guidance and a ½ wave 'converging antenna' 1004, 1005 (note that the folded antenna system described in FIG. 6 could be used to provide equivalent service) for alignment and ranging from the antenna end 1006 to a wireless charging pad of the GA 1003. All three antenna elements 1004, 1005, and 1007 originate at the GA 1003.

In the example of FIG. 10*a*, the beacon signal is pulsed on the long leaky line 1007 and is continuously transmitted on the sections of the converging antenna 1004, 1005 to allow differentiation since all antenna lines 1004, 1005, and 1007 are transmitting in the same ISM spectrum (e.g. one of 13.56 MHz, 27.12 MHz, 40.68 MHz). The beacon signal used in the long leaky line antenna 1007 and converging antenna segments 1004, 1005 may be either in-phase or out of phase since the differentiation between the two antennas is based on signal modulation (e.g. ASK, pulsing).

Figure 10B:
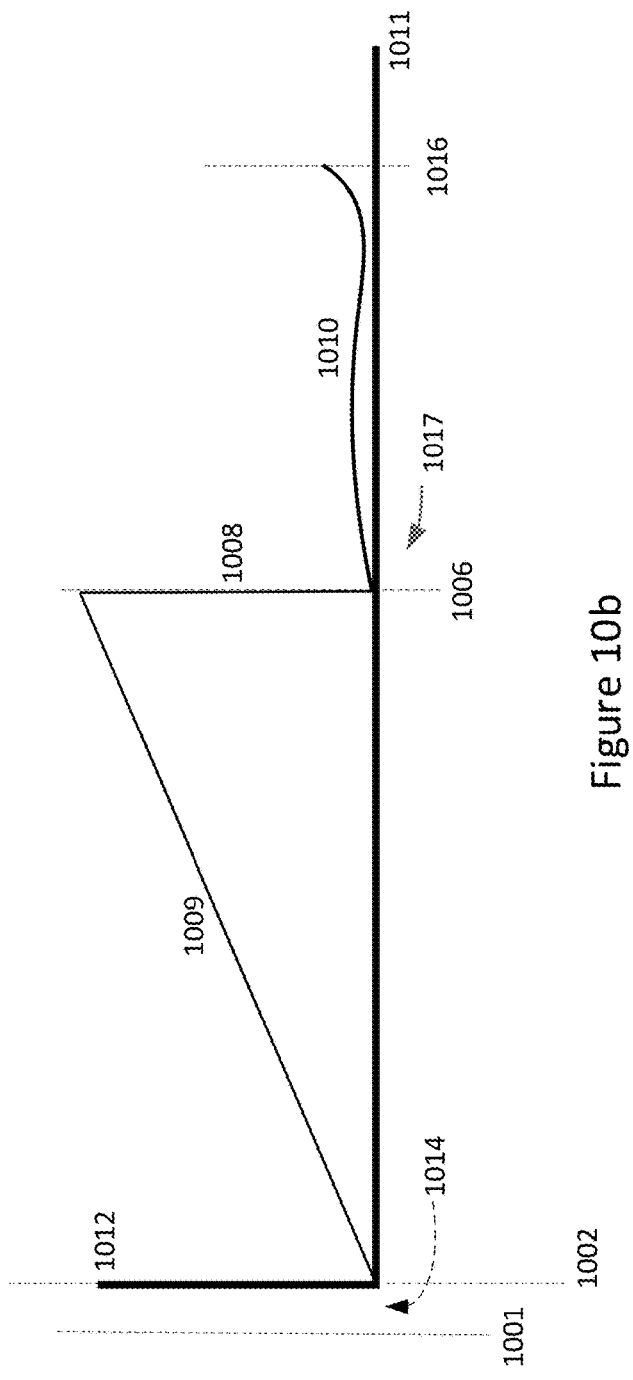

FIG. 10*b* shows a graphical representation of the signal error function of the vehicle alignment system illustrated in FIG. 10*a*. The X-axis 1011 shows the range while the Y-Axis 1012 shows the relative beacon signal phase difference 1009 between the receiver antennas 22, 24. As the vehicle moves over the end of the wireline antenna 1007, both receiver antennas 22, 24 begin to receive the beacon signal at the end of the range 1016.

As the vehicle approaches the long leaky line 1007, signal detection via either or both of the receiver antennas 22, 24 allows for initial guidance using the amplitude and phase difference to provide Y-axis (side-to-side) error indication 1010. When the vehicle assembly mounted antennas 22, 24 detect the continuous beacon signal from the converging antenna structure 1004, 1005, indicating that the receiver antennas 22, 24 have passed the converging antenna structure threshold 1006, a cutover from using the leaky line 1007 to the converging antennas 1004, 1005 will be performed. As shown in FIG. 10*b*, this cutover results in an abrupt change (after the region 1017 where the three transmitted signals co-channel interference creates an ambiguous area where signal differentiation is impeded) in received phase 1008 as the received beacon signal changes and the relative received signal phase difference 1009 goes to 180° out-of-phase. Once the signal source changeover is accomplished, the vehicle alignment and ranging proceeds as detailed in FIG. 9*b* (or as in FIG. 8*b* if a folded antenna is used).

Once the vehicle receiver antennas have approached the zero-phase difference threshold 1002, the vehicle assembly-based transmitter can initiate communications with the ground assembly receiver(s). A final positioning method (or predictive model based on the velocity determined by the ranging provided by use of the converged antenna system) can be used for the distance 1014 between the zero relative phase difference threshold 1002 and the midline 1001 of the GA 1003.

This multi-antenna approach may also serve as a 'soft-fail' system where failure of either antenna structure or transmission facility will not preclude operation of the other.

An optional short-range transmitter unit 1013 (e.g., radio-frequency transmitter) may be included at the end of any leaky line installation. The radio-frequency transmitter unit 1013 may include a transmitter, a processor, and a memory as well as a wired communications subsystem for receiving data from or via the GA 1003 via the leaky line cable 1007. This transmitter unit 1013 may broadcast its GPS location and the capabilities of the charging station (e.g. power levels offered, power types (AC/DC) available, connector types supported, payment forms available (e.g. virtual wallets support, online account(s) supported, memberships supported, swipe card, credit, debit, club cards)). The transmitter unit 1013 is also powered via the leaky line 1012 using a DC offset to the leaky line beacon signal(s).

During a charging session (i.e. once a vehicle is positioned over the GA 1003), the transmitter unit 1013 may be turned off or may broadcast information to other passing vehicles (e.g. the charger is in use, time left in charging session). Information may be updated from the GA 1003 via the leaky line 1007 using signal modulation (e.g. pulsed, amplitude modulated).

In any of the described installations, a failed pre-charging session alignment may be reset by moving off the GA and restarting the alignment process when a range measurement above threshold (e.g. when sufficient range is obtained for correction of any Y-Axis (side-to-side) error) can be obtained.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

We claim:

1. A vehicle alignment system for aligning a first wireless power induction coil of a vehicle with a second wireless power induction coil in a parking slot for wireless charging through use of magnetic resonant induction, comprising:
   a ground assembly disposed in the parking slot, the ground assembly housing the second wireless power induction coil; and a transmission line connected to the ground assembly and disposed in the parking slot so as to leak a signal having an operating frequency that is detected by the vehicle to guide the vehicle to the second wireless power induction coil for charging, the transmission line comprising one of a continuous wireline monopole antenna disposed in a folded pattern relative to the ground assembly or a converging wireline dipole antenna having first and second sections that extend away from the ground assembly, wherein the vehicle detects the signal having the operating frequency that leaks from the transmission line using at least two vehicle mounted antennas mounted on opposite sides of the transmission line when the vehicle is aligned in the parking slot and processes respective signals detected by the at least two vehicle mounted antennas to determine a relative signal phase and amplitude between the respective signals that is representative of alignment of the vehicle left-right with respect to the transmission line and to determine a distance to the ground assembly.

2. A system as in claim 1, wherein the transmission line is disposed along a centerline of the parking slot.

3. A system as in claim 1, wherein the transmission line is parallel to but offset from a center line of the parking slot.

4. A system as in claim 1, wherein the transmission line is curved along a trajectory to guide the vehicle to the ground assembly in the parking slot.

5. A system as in claim 1, wherein the operating frequency is one of 40.68 MHz or 13.56 MHz.

6. A system as in claim 1, wherein the transmission line comprises the continuous wireline monopole antenna disposed in a folded pattern relative to the ground assembly, a first end of the continuous wireline monopole antenna being connected to the ground assembly and offset on a first side of a centerline of the ground assembly, and a second end of the continuous wireline monopole antenna being adjacent to the ground assembly on a second side of the centerline of the ground assembly.

7. A system as in claim 6, wherein the continuous wireline monopole antenna comprises first and second sections that extend substantially in parallel on the first and second sides of the centerline of the ground assembly.

8. A system as in claim 1, wherein the transmission line comprises the converging wireline dipole antenna having the first and second sections that extend away from the ground assembly, the first and second sections being parallel to each other and offset on respective sides of a centerline of the ground assembly, first ends of the first and second sections being connected to the ground assembly.

9. A system as in claim 1, wherein the ground assembly comprises a wireless charger comprising one or more wireless charging coils and magnetic inductive resonance communications transceivers and a beacon signal source that transmits a beacon signal on the transmission line.

10. A system as in claim 1, further comprising a leaky transmission line connected to the ground assembly and extending away from the ground assembly beyond an end of the transmission line that is remote from the ground assembly.

11. A system as in claim 10, wherein the ground assembly comprises a wireless charger comprising one or more wireless charging coils and magnetic inductive resonance communications transceivers and a beacon signal source that pulses a beacon signal on the leaky transmission line and provides a continuous beacon signal on the transmission line.

12. A system as in claim 10, further comprising a transmitter at an end of the leaky transmission line that is remote from the ground assembly, the transmitter receiving data from the ground assembly via the leaky transmission line and broadcasting at least a portion of the data received from the ground assembly.

13. A system as in claim 12, wherein the data broadcast by the transmitter at the end of the leaky transmission line includes at least one of power levels offered by the ground assembly, power types (AC/DC) available at the ground assembly, connector types supported by the ground assembly, payment forms accepted by the ground assembly, whether a wireless charger of the ground assembly is in use, or time left in a charging session being performed by the ground assembly.

14. A method for aligning a first wireless power induction coil of a vehicle with a second wireless power induction coil in a parking slot for wireless charging through use of magnetic resonant induction, comprising:

a ground assembly disposed in the parking slot providing a beacon signal to a transmission line disposed in the parking slot so as to guide the vehicle to the second wireless power induction coil for charging;

the transmission line leaking the beacon signal at an operating frequency, the transmission line comprising one of a continuous wireline monopole antenna disposed in a folded pattern relative to the ground assembly or a converging wireline dipole antenna having first and second sections that extend away from the ground assembly;

aligning the vehicle left-right in the parking slot relative to the transmission line for charging by the second wireless power induction coil, the aligning comprising at least two vehicle mounted antennas mounted on opposite sides of the transmission line when the vehicle is aligned in the parking slot detecting the beacon signal at the operating frequency that leaks from the transmission line; and adjusting alignment of the vehicle relative to the second wireless power induction coil based on a relative signal phase and amplitude between the respective signals that is representative of alignment of the vehicle left-right with respect to the transmission line and a distance to the ground assembly.

15. A method as in claim 14, wherein the transmission line comprises the continuous wireline monopole antenna disposed in a folded pattern relative to the ground assembly, further comprising connecting a first end of the continuous wireline monopole antenna to the ground assembly and offsetting the first end on a first side of a centerline of the ground assembly, extending first and second sections of the continuous wireline monopole antenna substantially in parallel on the first side and on a second side of the centerline of the ground assembly, and placing a second end of the continuous wireline monopole antenna adjacent to the ground assembly on the second side of the centerline of the ground assembly.

16. A method as in claim 14, wherein the transmission line comprises the converging wireline dipole antenna having the first and second sections that extend away from the ground assembly, further comprising placing the first and second sections parallel to each other so as to be offset on respective sides of a centerline of the ground assembly and connecting first ends of the first and second sections to the ground assembly.

17. A method as in claim 14, further comprising connecting a leaky transmission line to the ground assembly such that the leaky transmission line extends away from the ground assembly beyond an end of the transmission line that is remote from the ground assembly.

18. A method as in claim 17, further comprising the ground assembly pulsing a beacon signal on the leaky transmission line and providing a continuous beacon signal on the transmission line.

19. A method as in claim 17, further comprising providing a transmitter at an end of the leaky transmission line that is remote from the ground assembly, the transmitter receiving data from the ground assembly via the leaky transmission line, and the transmitter broadcasting at least a portion of the data received from the ground assembly.

20. A method as in claim 19, wherein the transmitter broadcasting data comprises broadcasting data including at least one of power levels offered by the ground assembly, power types (AC/DC) available at the ground assembly, connector types supported by the ground assembly, payment forms accepted by the ground assembly, whether a wireless charger of the ground assembly is in use, or time left in a charging session being performed by the ground assembly.

* * * * *